United States Patent [19]

Kaji et al.

[11] Patent Number: 4,599,612

[45] Date of Patent: Jul. 8, 1986

[54] DISPLAYING AND CORRECTING METHOD FOR MACHINE TRANSLATION SYSTEM

[75] Inventors: Hiroyuki Kaji, Tama; Yoshihiko Nitta, Fujisawa, both of Japan

[73] Assignee: Hitachi, Ltd., Tokyo, Japan

[21] Appl. No.: 447,184

[22] Filed: Dec. 6, 1982

[30] Foreign Application Priority Data

Dec. 14, 1981 [JP] Japan ................... 56-200192

[51] Int. Cl.$^4$ ................... G09G 1/06; G09B 19/06
[52] U.S. Cl. ................... 340/723; 340/709; 434/157
[58] Field of Search ............... 340/721, 711, 750, 731, 340/723, 790; 364/900; 434/156, 157

[56] References Cited

U.S. PATENT DOCUMENTS

| | | | |
|---|---|---|---|
| 4,158,236 | 6/1979 | Levy | 364/900 |
| 4,159,536 | 6/1979 | Kehoe et al. | 364/900 |
| 4,197,590 | 4/1980 | Sukonick et al. | 340/750 X |
| 4,278,973 | 7/1981 | Hughes et al. | 340/711 X |
| 4,355,370 | 10/1982 | Yanagiuchi | 434/156 X |
| 4,386,410 | 5/1983 | Pandya et al. | 340/716 X |
| 4,404,554 | 9/1983 | Tweedy, Jr. et al. | 340/750 |
| 4,412,305 | 10/1983 | Yoshida | 434/157 |
| 4,417,319 | 11/1983 | Morimoto et al. | 434/157 X |
| 4,509,137 | 4/1985 | Yoshida | 434/157 X |

Primary Examiner—Gerald L. Brigance
Assistant Examiner—Vincent P. Kovalick
Attorney, Agent, or Firm—Antonelli, Terry & Wands

[57] ABSTRACT

In a system wherein a first text in a first natural language is translated into a second text in a second natural language; a text displaying and correcting system comprising a first memory area for storing parts of the first text divided in predetermined units, with identifications assigned to the respective parts, and a second memory area for storing predetermined units of the second text corresponding to the aforementioned units of the first text, with the same identifications assigned thereto, so that the first and second texts are simultaneously displayed on a screen of a display unit, and that the text is revised in each unit with identification assigned.

4 Claims, 16 Drawing Figures

FIG. 2(A)

| ESC | 5 | ESC | 1 | 1 | ESC | 4 | USUALLY | ESC | 5 | GO | ESC |
| 3 | TO | ESC | 3 | SCHOOL | ESC | 2 | BY | ESC | 2 | BUS, | ESC | 6 |
| BUT | ESC | 9 | YESTERDAY | ESC | 7 | 1 | ESC | --- |

FIG. 2(B)

| ESC | 5 | ESC | 1 | WATAKUSHIWA | ESC | 2 | BASUNIMOTTE | ESC |
| 3 | GAKKOE | ESC | 4 | ITSUMO | ESC | 5 | IKU, | ESC | 6 |
| SHIKASHI, | ESC | 7 | WATAKUSHIWA | --- |

FIG. 3(A)
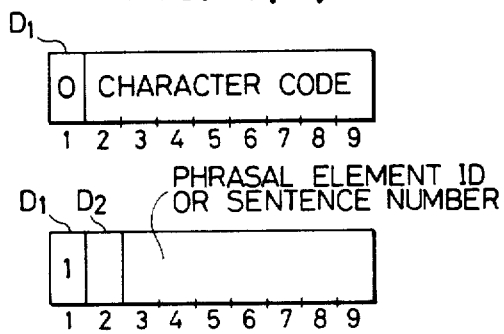
FIG. 3(B)
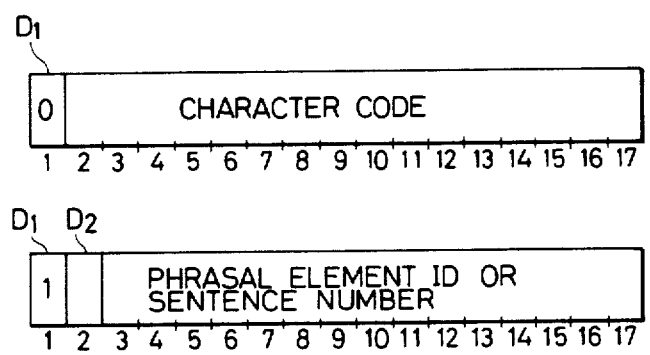
FIG. 3(C)
| $P_1$ | DISPLAY START ADDRESS OF ENGLISH TEXT |
|---|---|
| $P_2$ | DISPLAY START ADDRESS OF JAPANESE TEXT |
| $P_3$ | CURSOR INDICATOR |
| $P_4$ | CURSOR ADDRESS |
| $P_5$ | HIGHLIGHTED SENTENCE NUMBER |
| $P_6$ | HIGHLIGHTED PHRASAL ELEMENT ID |

FIG. 4(A)

| 9 bits | | |
|---|---|---|
| 1 | / | 5 |
| 1 | 0 | 1 |
| 0 | | 1 |
| 1 | 0 | 4 |
| 0 | | U |
| 0 | | S |
| 0 | | U |
| 0 | | A |
| 0 | | L |
| 0 | | L |
| 0 | | Y |
| 1 | 0 | 5 |
| 0 | | G |
| 0 | | O |
| 1 | 0 | 3 |
| 0 | | T |
| 0 | | O |
| 1 | 0 | 3 |
| 0 | | S |
| 0 | | C |
| 0 | | H |
| 0 | | O |
| 0 | | O |
| 0 | | L |
| 1 | 0 | 2 |
| 0 | | B |
| 0 | | Y |
| 1 | 0 | 2 |
| 0 | | B |
| 0 | | U |
| 0 | | S |
| 0 | | , |
| 1 | 0 | 6 |
| 0 | | B |
| 0 | | U |
| 0 | | T |
| 1 | 0 | 9 |
| 0 | | Y |
| 0 | | E |
| 0 | | S |
| 0 | | T |

| 17 bits | | |
|---|---|---|
| 1 | / | 5 |
| 1 | 0 | 1 |
| 0 | | WATAKUSHI |
| 0 | | WA |
| 1 | | 2 |
| 0 | | BA |
| 0 | | SU |
| 0 | | NI |
| 0 | | YO |
| 0 | | T |
| 0 | | TE |
| 1 | 0 | 3 |
| 0 | | GAK |
| 0 | | KO |
| 0 | | E |
| 1 | 0 | 4 |
| 0 | | I |
| 0 | | TSU |
| 0 | | MO |
| 1 | 0 | 5 |
| 0 | | I |
| 0 | | KU |
| 0 | | , |
| 1 | 0 | 6 |
| 0 | | SHI |
| 0 | | KA |
| 0 | | SHI |
| 0 | | , |
| 1 | 0 | 7 |
| 0 | | WATAKUSHI |
| 0 | | WA |

FIG. 4(B)

| | | |
|---|---|---|
| 1 | / | 5 |
| 1 | 0 | 1 |
| 0 | | WATAKUSHI |
| 0 | | WA |
| 1 | 0 | 4 |
| 0 | | I |
| 0 | | TSU |
| 0 | | MO |
| 1 | 0 | 2 |
| 0 | | BA |
| 0 | | SU |
| 0 | | NI |
| 0 | | YO |
| 0 | | T |
| 0 | | TE |
| 1 | 0 | 3 |
| 0 | | GAK |
| 0 | | KO |
| 0 | | E |
| 1 | 0 | 5 |
| 0 | | I |
| 0 | | KU |
| 0 | | , |
| 1 | 0 | 6 |
| 0 | | SHI |
| 0 | | KA |
| 0 | | SHI |
| 0 | | , |
| 1 | 0 | 7 |
| 0 | | WATAKUSHI |
| 0 | | WA |

FIG. 4(C)

| | | |
|---|---|---|
| 1 | / | 5 |
| 1 | 0 | 1 |
| 0 | | WATAKUSHI |
| 0 | | WA |
| 1 | 0 | 4 |
| 0 | | I |
| 0 | | TSU |
| 0 | | MO |
| 1 | 1 | 2 |
| 0 | | BA |
| 0 | | SU |
| 0 | | DE |
| 1 | 0 | 3 |
| 0 | | GA |
| 0 | | K |
| 0 | | KO |
| 1 | 0 | E |
| 0 | | I |
| 0 | | KU |
| 0 | | , |
| 1 | 0 | 6 |
| 0 | | SHI |
| 0 | | KA |
| 0 | | SHI |
| 0 | | , |
| 1 | 0 | 7 |
| 0 | | WATAKUSHI |
| 0 | | WA |

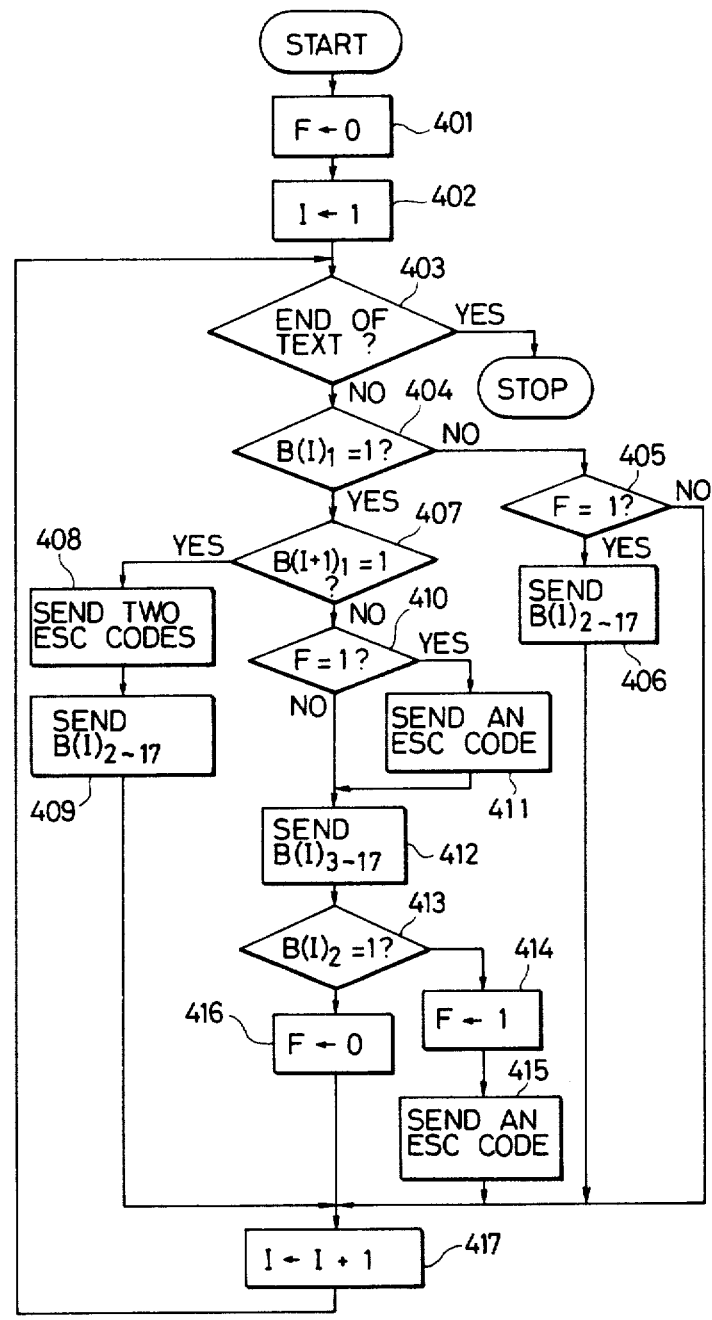

DISPLAYING AND CORRECTING METHOD FOR MACHINE TRANSLATION SYSTEM

BACKGROUND OF THE INVENTION

The present invention relates to a text displaying and correcting method in a system wherein a text described in a first language (for example, English) is automatically translated into sentences described in a second language (for example, Japanese).

In an automatic translation system employing a digital computer, it is unavoidable for a person to check and correct result of the translation by the computer. Heretofore, general-purpose terminal equipment or a word processor has been used for the correction. Since, however, it does not have functions suitable for the correction of translation, there has been the problem that the efficiency of the correcting task is very low.

SUMMARY OF THE INVENTION

An object of the present invention is to provide a displaying and correcting method which affords functions suitable for a translation system.

Concretely, an object of the present invention is to provide a displaying method in which both a text described in a source language and a text described in a target language are simultaneously displayed on a display unit, and in which when one text is scrolled, the corresponding text can be simultaneously scrolled.

Another object of the present invention is to provide a displaying method in which a phrasal element in one text may be highlighted together with the corresponding phrasal element in the other text.

Another object of the present invention is to provide a correcting method in which corrections such as an amendment, insertion or deletion can be made in the unit of a phrasal element, not in the unit of a character in a displayed text.

In order to accomplish these objects, according to the present invention, a sentence in the text of a source language is divided into phrasal elements, and identifications are assigned to the respective phrasal elements. The expression "phrasal element" is defined as the minimum unit having a linguistic meaning, for example, a string of nouns, (an auxiliary verb+a verb), (an article+a noun), (a preposition+a noun), and (an adjective+a noun).

Further, in the text of a target language, respective words corresponding to the aforementioned phrasal elements are assigned the same identifications as the aforementioned identifications. Both the texts are retained in a memory and processed by a processor as a series of data consisting of the identifications and phrasal elements, so that the corresponding relationship of both the texts is consistently held.

The other objects and features of the present invention will become more apparent from the following description when read in conjunction with the attached drawings.

BRIEF DESCRIPTION OF THE DRAWINGS

FIGS. 2(A) and 2(B) are a diagram showing an example of a text transmitted from a host computer to a terminal equipment;

FIGS. 3(A), 3(B) and 3(C) are diagrams showing the structures of words and various parameters in a memory;

FIGS. 4(A), 4(B) and 4(C) are diagrams showing examples of text data stored contents in the text memory;

FIG. 10 is a flowchart of processing of transmitting a revised text to the hose computer.

DETAILED DESCRIPTION OF THE PREFERRED EMBODIMENT

In the following description, for the sake of convenience, a source language shall be assumed English, and a target language Japanese.

Figure 1:
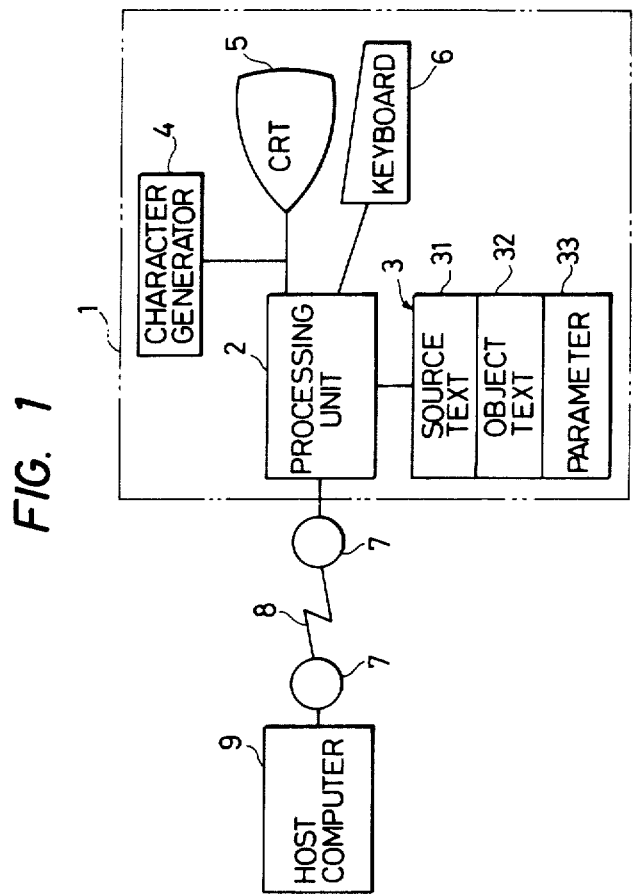
FIG. 1 is a diagram showing the general arrangement of a machine translation system according to the present invention.

FIG. 1 shows an example of a system which is used for performing a text displaying and correcting method according to the present invention. The system includes a terminal equipment 1 and a host computer 9.

The terminal equipment 1 is composed of a processing unit 2, a memory 3, a character generator 4, a CRT 5 and a keyboard 6, and is connected to the host computer 9 through modems 7 as well as a communication line 8. Translation is executed by the host computer 9, and an English text and the translated Japanese text are transmitted to the terminal equipment 1. In the terminal equipment 1, the English text and the Japanese text are simultaneously displayed, and the user revises the Japanese text. The revised text is transmitted to the host computer 9, and is stored in a file.

In the automatic translation processing in the host computer 9, the English text is analyzed and is divided into elements (called "phrasal elements") having certain syntactic or symantic. Japanese equivalents, also called "phrasal elements", are allotted to the respective phrasal elements, and the phrasal elements are arranged in a sequence acceptable as Japanese, whereby the Japanese text is generated. The details of this translation processing are described in U.S. application Ser. No. 415,601, filed Sept. 7, 1982, and assigned to the same assignee as the present invention. Herein, the phrasal elements are assigned identifications (abbreviated to "IDs"), and data as exemplified in FIG. 2 is transmitted to the terminal equipment 1. FIG. 2(A) is an example of English text, and FIG. 2(B) is an example of Japanese text. A Japanese character is coded with two bytes, although, in FIG. 2(B), it is indicated by a number of alphabetical characters according to "romaji" notation. An ESC (escape) denotes the separation between one phrasal element and the next phrasal element, or the separation between sentences. In the data, the byte following the ESC code is the phrasal element ID. At the head of a sentence, the ESC code and a sentence number are affixed. Since the sentence number is always held between the ESC codes, it can be distinguished from the phrasal element ID. The addition of the sentence number make it unnecessary for the phrasal element ID to be unique in the text. The phrasal element only has to be unique within each sentence. Accordingly, the phrasal element ID can be coded with several bits.

The memory 3 includes an English text area 31, a Japanese text area 32, and an area 33 for storing various parameters. The English text area composed of 9-bit words, and the Japanese text area is composed of 17-bit words. They are individually given addresses 1, 2, 3, . . . FIG. 3(A) shows a word in the English text area 31. The content expressed by the word differs depending upon whether the first bit $D_1$ of the particular word is "0" or "1". When the first bit $D_1$ is "0", the second to ninth bits form a code which expresses a character in the text. When the first bit is "1", the third to ninth bits express a phrasal element ID or a sentence number. Whether the phrasal element ID or the sentence number is expressed, is readily known from the following. That is, only a preceding word in the case where two words having the first bits $D_1$ of "1" have occurred in succession is the sentence number. The second bit $D_2$ of the word expressing the phrasal element ID is used as a flag which indicates if the corresponding phrasal element has been revised. Words in the Japanese text area 32 are shown in FIG. 3(B). It is the same as in the case of the English text area 31 that the content expressed by the particular word differs depending upon the first bit $D_1$. FIG. 4(A) shows the stored contents in the text areas 31 and 32 of the memory 3 in the case of FIG. 2.

The various parameters which are stored in the memory 3, are shown in FIG. 3(C). The display start address $P_1$ of the English text and the display start address $P_2$ of the Japanese text indicate the head addresses of those parts of the respective texts which are to be displayed on the CRT 5. A cursor indicator $P_3$ is set to "0" when the cursor lies on the English text, and to "1" when it lies on the Japanese text. The cursor address $P_4$ indicates the address of the cursor on the text. In addition, the sentence number and the phrasal element ID of the phrasal element to be displayed unlike the other parts are respectively stored in a highlighted sentence number $P_5$ and a highlighted phrasal element ID $P_6$.

Figure 5:
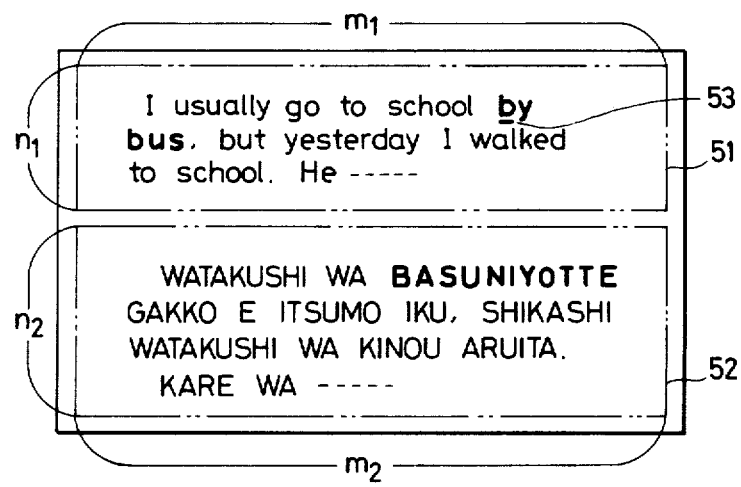
FIG. 5 is a diagram showing an example of text display.

As shown in FIG. 5, the screen of the CRT 5 is partitioned into an English text display portion 51 and a Japanese text display portion 52. The respective portions can display $m_1$ (characters/line)$\times n_1$ (lines) and $m_2$ (characters/line)$\times n_2$ (lines). Owing to processing to be described later, when one text is scrolled, the other text is scrolled interlockingly, so that the corresponding parts are displayed at all times. Moreover, the phrasal element in the position where the cursor exists is highlighted (by way of example, it is displayed at a brightness higher than that of the other phrasal elements). Since, in FIG. 5, the cursor 53 lies on the phrasal element "by bus" in the English text, this phrasal element and the corresponding phrasal element "BASU NI YOTTE" in the Japanese text are highlighted.

Figure 6:
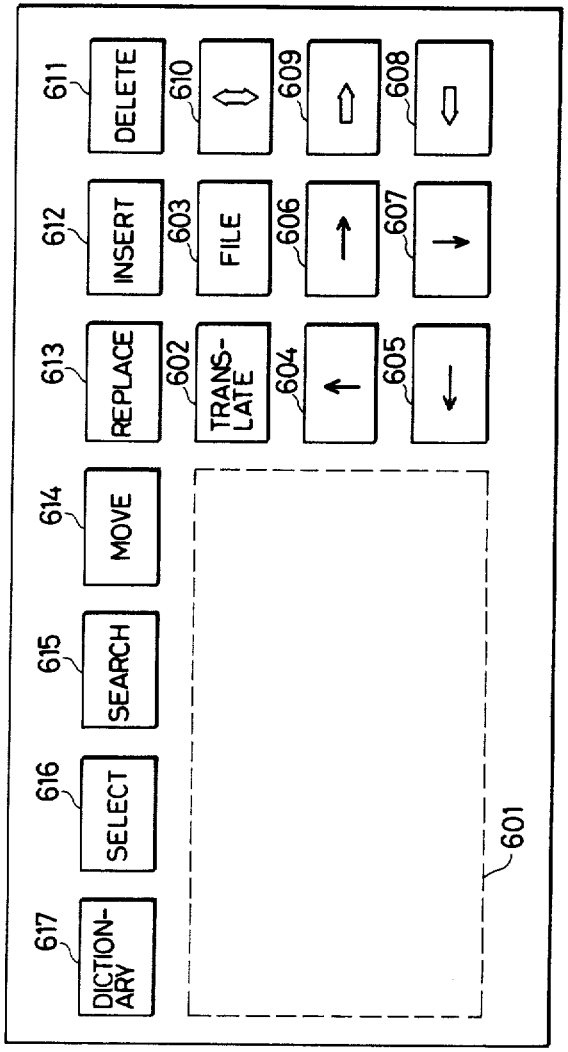
FIG. 6 is a diagram of a keyboard panel.

As shown in FIG. 6, the keyboard 6 is equipped with character keys 601, and besides, various function keys 602 to 617.

The functions of the processing unit 2 are (1) the process of writing the English text and the Japanese text transmitted from the host computer 9 into the memory 3, (2) the process of displaying the texts in the memory 3 on the CRT 5, (3) the process of updating the contents of the memory 3 in accordance with an input given from the keyboard 6, and (4) the process of transmitting the (revised) texts in the memory 3, to the host computer 9. These will be explained hereinbelow.

Figure 7:
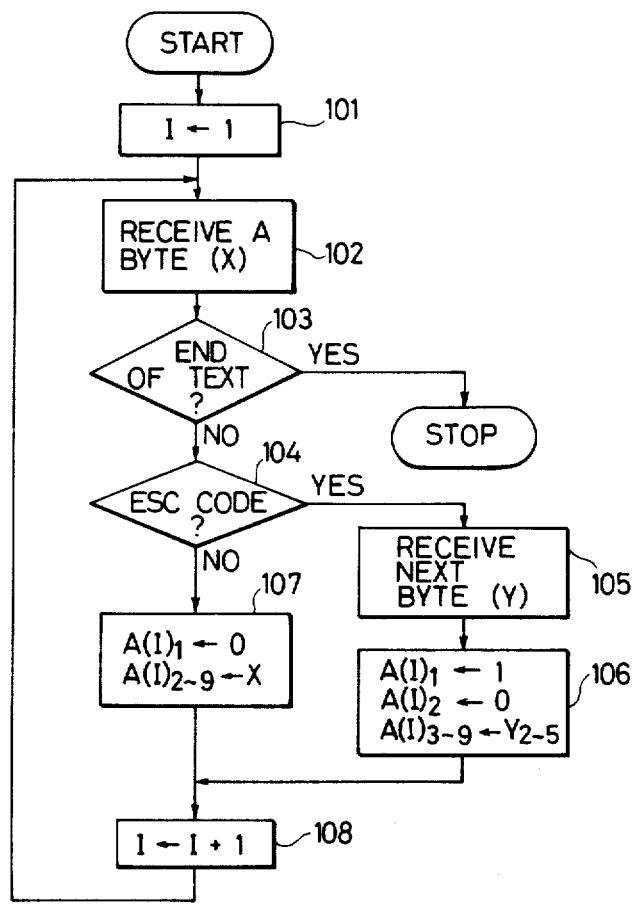
FIG. 7 is a flowchart of the processing of writing the text transmitted from the host computer into the memory.

(1) Writing Transmitted texts from Host computer 9 into Memory 3:

FIG. 7 shows a flowchart of the process in which the English text transmitted from the host computer 9 is written into the English text area of the memory 3. Quite the same applies to the Japanese text. In the figure, symbol I is an index indicative of the address of the English text area 31, and symbol A(I) indicates the word of the address I of the English text area 31. After an initial "1" has been first set in I (101), transmitted data is received byte by byte (102). Unless the end of the data has been reached (103), whether or not the byte is the ESC code is decided (104). When it is the ESC code, the ensuing one byte is determined to be the sentence number of the phrasal element ID. After this byte is received (105) the word in which the first bit $A(I)_1$ is "1", the second bit $A(I)_2$ is "0" and the third–ninth bits $A(I)_{3-9}$ are the sentence number of the phrasal element ID, is written into the memory 3 (106). When the byte is not the ESC code sentence number or the phrasal element ID, the byte is determined to be the character code. Therefore, the word in which the first bit $A(I)_1$ is "0" and the second–ninth bits $A(I)_{2-9}$ are this character code, is written into the memory (107). In either case, after the word A(I) has been written in the address I, "1" is added to I (108), and the processing flow advances to the reception of the next byte (102).

Figure 8:
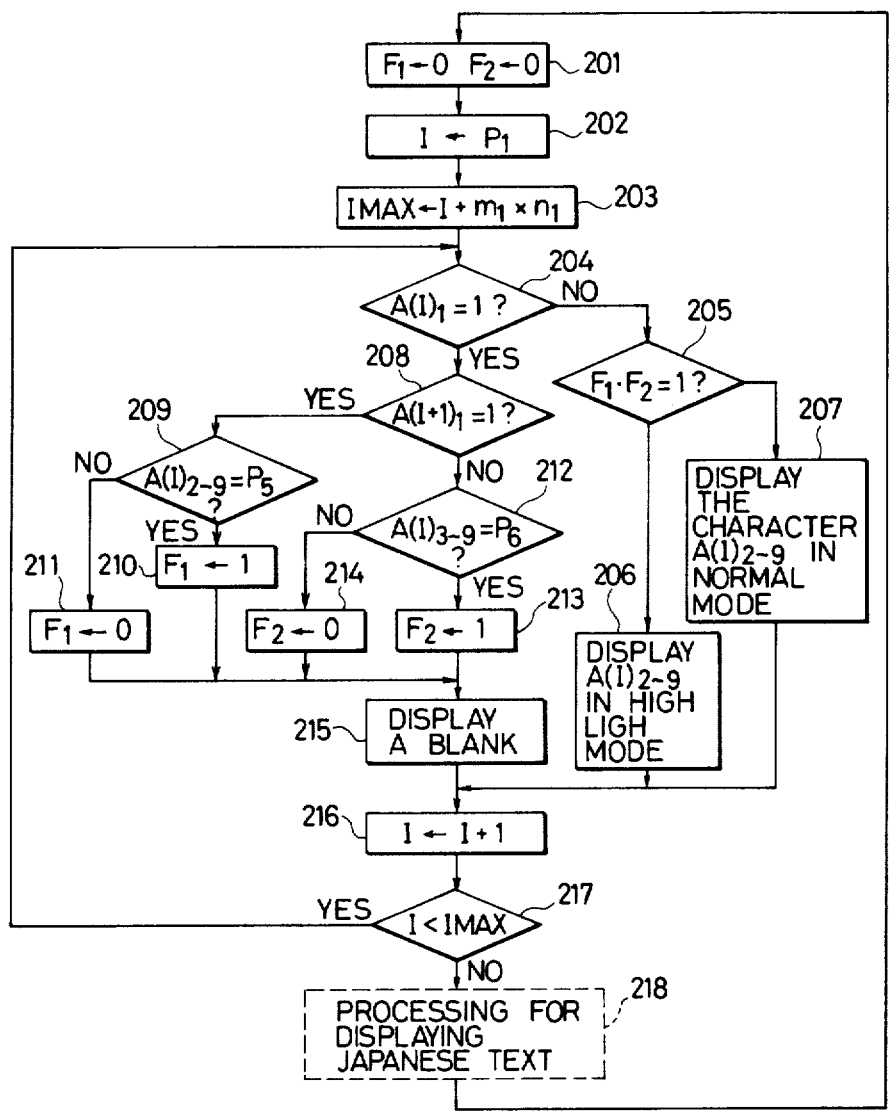
FIG. 8 is a flowchart of the processing of displaying the text in the memory on a CRT.

(2) Displaying Text in Memory 3 on CRT 5:

FIG. 8 shows a flowchart of the processing of displaying the text. Only the processing of the English text is illustrated in detail, and the processing of the Japanese text is omitted because it is similar to that of the English text. In the figure, $F_1$ and $F_2$ are flags which indicate if characters being processed are to be highlighted. First, "0" is set in both $F_1$ and $F_2$ (201), and the display start address $P_1$ and the display end address $P_1+m_1\times n_1$ of the text are respectively set in I and IMAX (202 and 203). Whether or not the word A(I) of the address I is the character code is decided (204). When it is the character code, this code is sent to the character generator 4, and the character is displayed on the CRT 5. In this case, when both the flags $F_1$ and $F_2$ are "1" (205), the character is highlighted (206), otherwise it is displayed in a normal mode (207). On the other hand, in a case where A(I) is the sentence number or the phrasal element ID, whether it is the former or the latter can be distinguished by investigating the next word A(I+1) (208). In the case of the sentence number, it is compared with the highlighted sentence number $P_5$ (209). When they coincide, "1" is set in $F_1$ (210), and when not, "0" is set in $F_1$ (211). In the case of the phrasal element ID, it is compared with the highlighted phrasal element ID $P_6$ (212). When they coincide, "1" is set in $F_2$ (213), and when not, "0" is set in $F_2$ (214). The word which is the sentence number or the phrasal element ID, is displayed as a blank on the CRT screen (215). After A(I) has been displayed, "1" is added to I (216). If I is within a display range (217), the flow advances to the processing of the next word. If I is beyond the display range, the flow shifts to the process of displaying the Japanese text (218).

(3) Updating Content of Memory 3 in accordance with Input from Keyboard 6:

Inputs from the keyboard 6 are broadly classified into the alteration of the display range or the highlighted phrasal element consequent upon the movement of the cursor, and the revision of the text.

First, the movement of the cursor will be described. As cursor moving keys, there are ones shown at 604–610 in FIG. 6. There will now be explained a case where the cursor position flag $P_3$ is "0", namely, a case where the cursor lies on the English text. Even when the cursor position flag is "1", operations are similar. When the key 605 is depressed, the cursor address $P_4$ is decreased by one. However, when $P_4$ is (a multiple of $m_1$)+1, it remains unchanged. When the key 606 is depressed, "1" is added to $P_4$. However, when $P_4$ is a multiple of $m_1$, it remains unchanged. When the key 604 is depressed, $P_4$ is decreased by $m_1$. When the key 607 is depressed, $m_1$ is added to $P_4$. Besides, when the key 608 is depressed, the English text area is scanned in the backward direction from the current address $P_4$, so as to find the word which is the phrasal element ID. The (address of the second occurring phrasal element ID)+1 is set in $P_4$. When the key 609 is depressed, the English text area is scanned in the forward direction from the current address $P_4$, so as to find the word which is the phrasal element ID. The (address of the first occurring phrasal element ID)+1 is set in $P_4$. Further, when the key 610 is depressed, the cursor position flag $P_3$ is inverted into "1", and simultaneously, the Japanese text is scanned to find the highlighted phrasal element, the address of the first character of which is set in the cursor address $P_4$.

Figure 9:
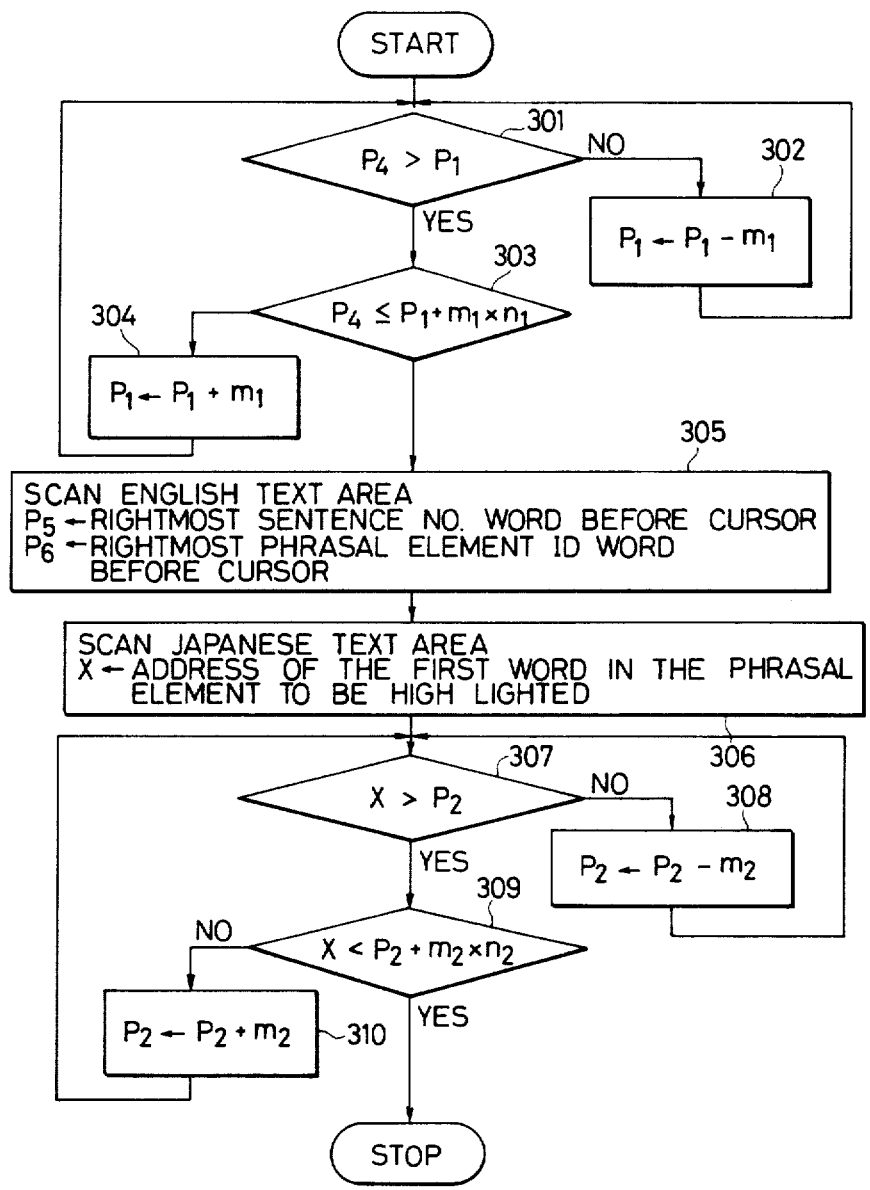
FIG. 9 is a flowchart of the processing of updating the content of the memory in accordance with an input from a keyboard.

When the cursor has been moved, it becomes necessary to scroll the screen or to alter the highlighted phrasal element, so that the parameters $P_1$, $P_2$, $P_5$ and $P_6$ stored in the memory 3 are updated. The flowchart of this processing is shown in FIG. 9. The figure concerns the case where the cursor lies on the English text. When the cursor address $P_4$ is smaller than the display start address $P_1$ of the English text (301), $P_1$ is decreased by $M_1$ (302). When $P_4$ is greater than the display end address $P_1+m_1\times n_1$ of the English text (303), $P_1$ is increased by $M_1$ (304). Subsequently, the phrasal element to be highlighted is identified on the basis of the position of the cursor, and the sentence number and the phrasal element ID thereof are respectively set in the highlighted sentence number $P_5$ and the highlighted phrasal element ID $P_6$ (305). Further, the address X of the highlighted phrasal element in the Japanese text is found (306). When X is smaller than the display start address $P_2$ of the Japanese text (307), $P_2$ is decreased by $M_2$ (308), and when X is greater than the display end address $P_2+m_2\times n_2$ of the English text (309), $P_2$ is increased by $M_2$ (310).

In the next place, the function of revising the text will be explained. A 'delete' key 611, an 'insert' key 612, a 'replace' key 613 and a 'move' key 614 are prepared for the revision of the text. The deleting, inserting or replacing operation is such that, after the pertinent part has been appointed with the cursor, a new character string (except the case of deletion) is inputted through the character keys 601. In inputting the Japanese character queue, such a method as "kana"-to-Chinese character conversion is employed. When the Japanese text has been revised, not only the character data of the text area is updated, but also "1" is set in the second bit of the word containing the phrasal element ID of the revised phrasal element. In addition, the 'move' key 614 serves to change the order of phrasal elements. When the phrasal element to be moved and the destination of the movement are appointed with the cursor, phrasal element data within the text area, inclusive of the phrasal element ID, are moved. FIGS. 4(B) and 4(C) illustrate examples of the text revision. FIG. 4(B) shows stored contents in the case where, in the Japanese text of FIG. 4(A), the phrasal element of "ITSUMO" has been moved between "WATAKUSHIWA" and "BASUNIYOTTE". FIG. 4(C) shows stored contents in the case where "NIYOTTE" of "BASUNIYOTTE" in FIG. 4(B) has been replaced with "DE".

Figure 11:
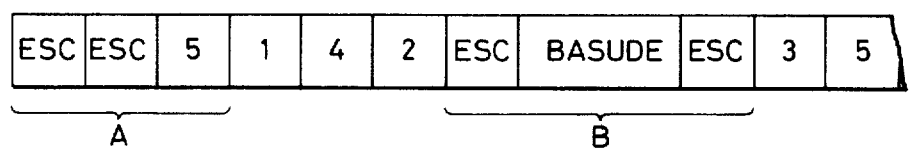
FIG. 11 is a diagram showing an example of data transmitted to the host computer.

(4) Transmitting Revised Japanese text in Memory 3 to Host computer 9:

FIG. 10 shows a flowchart of the processing. In the figure, symbol I denotes an index which indicates an address in the Japanese text area, and symbol B(I) indicates the word of the address I of the Japanese text area. In addition, F is a flag which indicates if a phrasal element being processed has been revised. After "0" has been set in F (401) and "1" as an initial value has been set in I (402), the following processing is executed till the end of the text (403). Whether or not B(I) is the character code, is investigated (404). When it is the character code, this character code is sent (406) only in case of the character of the revised phrasal element (405). When B(I) is the sentence number or the phrasal element ID, either is determined on the basis of B(I+1) (407). In the case of the sentence number, two ESC codes are sent in succession (408), whereupon sentence number data is sent (409). In the case of the phrasal element ID, it is sent (412). However, whether or not the preceding data sent is character data is decided (410), and in the case of the character data, the ESC code indicative of the end of the character data is sent before the phrasal element ID (411). After the phrasal element ID has been sent, whether or not the particular phrasal element has been revised is investigated (413). When it has been revised, "1" is set in F (414), and the ESC code indicating the start of the character data to be sent is subsequently sent (415). When the particular phrasal element has not been revised, "0" is set in F (416). In either case, after one word has been processed, "1" is added to I (417) so as to advance the flow to the processing of the next word. FIG. 11 shows an example of transmission data. This corresponds to the text in FIG. 4(C). In FIG. 11, A denotes the sentence number, and B the phrasal element subjected to the revision. The host computer 9 can restore the text on the basis of the fact that when the two ESC codes have succeeded, the sentence number follows, and that when one ESC code has appeared, the character data appears until the next ESC code appears, and by regarding the others as the phrasal element ID's. According to the present invention, the following effects are achieved:

(1) The corrections of a translated text can be efficiently performing owing to the functions of simultaneously displaying and interlockingly scrolling a text in the source language and the translated text in the target language, the function of dynamically displaying the corresponding relationship between the texts (in phrasal element unit) by the movement of a cursor, the function of moving phrasal elements, etc.

(2) To the end of storing the corresponding relationship of both the texts required for realizing the above functions, merely one bit may be added to each word of a refresh memory. Moreover, in revising the text, any special processing for holding the corresponding relationship is not required. Therefore, the responsiveness is good.

(3) The quantity of transmission data in the case of sending the revised text to a host computer can be remarkably compressed.

We claim:

1. A displaying method for a machine translation system, comprising the steps of:
   (a) dividing a sentence in a source language into a plurality of source phrasal elements, assigning identifications to the respective source phrasal elements and storing the respective source phrasal elements into a source text area of a memory with said identifications assigned thereto;
   (b) separating a sentence in a target language, which has been translated from said source language sentence, into target phrasal elements having the same linguistic meanings as said source phrasal elements, and storing the respective target phrasal elements into a target text area of the memory with the same identifications as assigned to corresponding source phrasal elements;
   (c) storing a display start address of a source text, a display start address of a target text, and the identification of a phrasal element to be displayed in a visually distinguishable manner with respect to the other text into a parameter area of the memory;
   (d) displaying on a first display area of a screen the text stored in said source text area and displaying on a second display area of said screen the text stored in said target text area; and
   (e) displaying in a visually distinguishable manner with respect to the other text the corresponding phrasal elements of the source text and the target text which have said identification stored in said parameter area of said memory.

2. A displaying method according to claim 1, which further comprises the steps of:
   (a) storing a cursor address of a cursor in the source or target text area into said parameter area of said memory when said cursor lies in said first or second display area;
   (b) deciding whether or not the cursor address lies between the display start address of the source or target text and a display end address of the source or target text which is calculated from said display start address;
   (c) shifting said display start address of the source or target text by a predetermined value when said cursor address does not lie between said start address and said end address;
   (d) deciding whether or not the address of the target phrasal element, which has the same identification as that of the source phrasal element at the cursor address, lies between the display start address and the display end address of the target text when the cursor lies on said first display area, and deciding whether that same address of the target phrasal element lies between the display start address and the display end address of the source text when the cursor lies on said second display area; and
   (e) shifting said display start address of the target or source text by a predetermined value when said address of said target or source phrasal element does not lie between said display start address and said display end address.

3. A displaying method according to claim 2, which further comprises the step of:
storing the identification of the phrasal element at the cursor address in said parameter area of said memory, and displaying in a distinguishable manner with respect to the other text, the phrasal element which has its identification stored in said parameter area of said memory.

4. A displaying method according to claim 2, which further comprises the steps of:
altering said stored cursor address by a predetermined value when a cursor moving key is depressed.

* * * * *